(12) United States Patent
Bustamente

(10) Patent No.: US 8,996,618 B2
(45) Date of Patent: *Mar. 31, 2015

(54) SYSTEM AND METHOD FOR PROVIDING SEQUENCED ANONYMOUS COMMUNICATION SESSIONS OVER A NETWORK

(71) Applicant: Match.com, L.L.C., Dallas, TX (US)

(72) Inventor: Michael G. Bustamente, Frisco, TX (US)

(73) Assignee: Match.com, L.L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,387

(22) Filed: Nov. 23, 2013

(65) Prior Publication Data

US 2014/0082087 A1   Mar. 20, 2014

Related U.S. Application Data

(63) Continuation of application No. 12/436,912, filed on May 7, 2009, now Pat. No. 8,621,090.

(51) Int. Cl.
  *G06F 15/16*  (2006.01)
  *H04L 29/06*  (2006.01)
  *H04L 29/08*  (2006.01)

(52) U.S. Cl.
  CPC .......... *H04L 65/403* (2013.01); *H04L 63/0407* (2013.01); *H04L 65/1069* (2013.01);

(Continued)

(58) Field of Classification Search
  USPC ......... 709/201, 202, 203, 204, 206, 207, 209, 709/223, 224, 226, 227, 228, 237, 239, 238, 709/241; 348/14.08; 370/389, 395.2, 351, 370/252, 431, 352, 392, 395.21, 395.52, 370/400, 401, 410, 411, 469; 455/519, 416, 455/412.1, 517, 518, 520, 521, 414.1; 707/999.003, 999.005, 999.01, 707/999.102; 726/12, 13
  See application file for complete search history.

(56) References Cited

U.S. PATENT DOCUMENTS 6,175,619 B1 * 1/2001 DeSimone ............... 379/202.01
6,408,001 B1 * 6/2002 Chuah et al. ................ 370/392

(Continued)

OTHER PUBLICATIONS

Notice of Allowance in U.S. Appl. No. 12/436,869 mailed on Mar. 14, 2014.

(Continued)

*Primary Examiner* — Saket K Daftuar
(74) *Attorney, Agent, or Firm* — Patent Capital Group

(57) ABSTRACT

A method for facilitating a sequenced, anonymous communications session in a communications environment is provided in one example that includes receiving, from a first endpoint, an anonymous, sequenced request for a communication session involving a second endpoint. The communication session is sequenced to occur at designated periods provided by the end user(s) and/or an administrator, while maintaining end user(s) anonymity.

20 Claims, 3 Drawing Sheets

PACKET (RECEIVED BY THE BROKER)

DESTINATION: ProfileNameA@match.com
SOURCE: Sally@gtalk.com

50

PACKET (TRANSMITTED BY THE BROKER)

DESTINATION: Joe@gizmo.com
SOURCE: ProfileNameZ@match.com

52

(52) U.S. Cl.
CPC .......... *H04L67/24* (2013.01); *H04L 29/08072*
(2013.01); *Y10S 707/99933* (2013.01); *Y10S*
*707/99935* (2013.01); *Y10S 707/9994*
(2013.01); *Y10S 707/99943* (2013.01)
USPC ........... 709/204; 709/201; 709/202; 709/203;
709/206; 709/207; 709/209; 709/223; 709/224;
709/226; 709/227; 709/228; 709/237; 709/239;
709/238; 709/241; 370/389; 370/395.2; 370/351;
370/252; 370/431; 370/352; 370/392; 370/395.21;
370/395.52; 370/400; 370/401; 370/410;
370/411; 370/469; 455/519; 455/416; 455/412.1;
455/517; 455/518; 455/455; 455/520; 455/521;
455/414.1; 707/999.003; 707/999.005; 707/999.01;
707/999.102; 726/12; 726/13; 348/14.08;
707/999.003

(56) References Cited

U.S. PATENT DOCUMENTS

| | | | |
|---|---|---|---|
| 6,564,261 B1* | 5/2003 | Gudjonsson et al. | 709/227 |
| 6,680,943 B1* | 1/2004 | Gibson et al. | 370/392 |
| 6,865,161 B1 | 3/2005 | Sponaugle et al. | |
| 7,139,811 B2* | 11/2006 | Lev Ran et al. | 709/217 |
| 7,151,749 B2* | 12/2006 | Vega-Garcia et al. | 370/241.1 |
| 7,171,482 B2* | 1/2007 | Jones et al. | 709/231 |
| 7,203,674 B2* | 4/2007 | Cohen | 1/1 |
| 7,394,811 B2* | 7/2008 | Gibson et al. | 370/392 |
| 7,440,562 B2 | 10/2008 | Barnes et al. | |
| 7,478,161 B2* | 1/2009 | Bernet et al. | 709/228 |
| 7,486,696 B2* | 2/2009 | Garg et al. | 370/468 |
| 7,499,720 B2 | 3/2009 | Idnani | |
| 7,539,127 B1* | 5/2009 | Shaffer et al. | 370/216 |
| 7,630,486 B2* | 12/2009 | Lee et al. | 379/265.01 |
| 7,640,293 B2* | 12/2009 | Wilson et al. | 709/203 |
| 7,649,881 B2* | 1/2010 | Casey | 370/352 |
| 7,792,065 B2* | 9/2010 | Jepson et al. | 370/261 |
| 8,051,130 B2* | 11/2011 | Logan et al. | 709/204 |
| 8,054,960 B1* | 11/2011 | Gunasekara | 379/201.12 |
| 8,281,027 B2* | 10/2012 | Martinez et al. | 709/231 |
| 8,316,134 B2* | 11/2012 | Tanimoto | 709/227 |
| 8,621,090 B2 | 12/2013 | Bustamente | |
| 8,885,012 B2 | 11/2014 | Bustamente | |
| 2002/0041590 A1 | 4/2002 | Donovan | |
| 2003/0224792 A1* | 12/2003 | Verma et al. | 455/436 |
| 2003/0235209 A1* | 12/2003 | Garg et al. | 370/468 |
| 2004/0030747 A1* | 2/2004 | Oppermann | 709/203 |
| 2005/0246419 A1* | 11/2005 | Jaatinen | 709/204 |
| 2005/0276268 A1* | 12/2005 | Poikselka et al. | 370/395.2 |
| 2006/0045243 A1 | 3/2006 | Durga et al. | |
| 2006/0281407 A1 | 12/2006 | Deeds et al. | |
| 2007/0019545 A1* | 1/2007 | Alt et al. | 370/230 |
| 2007/0064895 A1 | 3/2007 | Wong et al. | |
| 2007/0071223 A1* | 3/2007 | Lee et al. | 379/265.02 |
| 2007/0201480 A1* | 8/2007 | Bao et al. | 370/395.2 |
| 2007/0282621 A1 | 12/2007 | Altman et al. | |
| 2008/0070697 A1* | 3/2008 | Robinson et al. | 463/42 |
| 2008/0104227 A1* | 5/2008 | Birnie et al. | 709/224 |
| 2008/0144615 A1* | 6/2008 | Casey | 370/389 |
| 2008/0255989 A1* | 10/2008 | Altberg et al. | 705/40 |
| 2009/0024741 A1* | 1/2009 | Roach | 709/225 |
| 2009/0322597 A1 | 12/2009 | Medina-Herrero et al. | |
| 2010/0071053 A1* | 3/2010 | Ansari et al. | 726/12 |
| 2010/0077017 A1* | 3/2010 | Martinez et al. | 709/201 |
| 2010/0083364 A1* | 4/2010 | Fernandez Gutierrez | 726/13 |
| 2010/0088246 A1* | 4/2010 | Lim | 705/319 |
| 2010/0099389 A1* | 4/2010 | Zhu et al. | 455/414.1 |
| 2010/0106842 A1* | 4/2010 | Cosmadopoulos et al. | 709/228 |
| 2010/0195488 A1* | 8/2010 | Mehrotra et al. | 370/216 |
| 2010/0217837 A1* | 8/2010 | Ansari et al. | 709/218 |
| 2010/0217876 A1* | 8/2010 | Fikouras et al. | 709/228 |
| 2010/0241755 A1* | 9/2010 | Bassett et al. | 709/229 |
| 2010/0246576 A1 | 9/2010 | Bustamente | |
| 2010/0260174 A1* | 10/2010 | Preiss et al. | 370/389 |
| 2010/0283827 A1 | 11/2010 | Bustamente | |
| 2010/0285856 A1 | 11/2010 | Thomas | |
| 2010/0287286 A1 | 11/2010 | Bustamente | |
| 2011/0182205 A1* | 7/2011 | Gerdes et al. | 370/254 |
| 2011/0313647 A1 | 12/2011 | Koebler | |
| 2013/0003718 A9* | 1/2013 | daCosta et al. | 370/352 |
| 2013/0232213 A1 | 9/2013 | Bustamente | |
| 2013/0238708 A1 | 9/2013 | Bustamente | |

OTHER PUBLICATIONS

Final Office Action in U.S. Appl. No. 12/415,839 mailed on Jun. 6, 2014.
Request for Continued Examination in U.S. Appl. No. 12/436,869 filed on Jun. 16, 2014.
Rosenberg et al., "SIP: Session Initiation Protocol", Network Working Group Request for Comments: 3261, Jun. 2002 (202 pages).
Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).
Fiore, Andrew, et al., "Online Personals: An Overview," CHI 2004, Apr. 24-12, 2004, Vienna, Austria (pp. 1395-1398).
Non-Final Office Action in U.S. Appl. No. 12/415,839 mailed on Feb. 18, 2011.
Response to Non-Final Action dated Feb. 18, 2011 in U.S. Appl. No. 12/415,839 filed on May 18, 2011.
Final Office Action in U.S. Appl. No. 12/415,839 mailed on Jun. 23, 2011.
Request for Continued Examination and Amendment in U.S. Appl. No. 12/415,839 filed on Sep. 22, 2011.
Examiner Interview Summary in U.S. Appl. No. 12/415,839 mailed on Sep. 27, 2011.
Non-Final Office Action in U.S. Appl. No. 12/415,839 mailed on Oct. 13, 2011.
Response to Non-Final Action dated Oct. 13, 2011 in U.S. Appl. No. 12/415,839 filed on Jan. 13, 2012.
Final Office Action in U.S. Appl. No. 12/415,839 mailed in Apr. 25, 2013.
Request for Continued Examination and Amendment in U.S. Appl. No. 12/415,839 filed on Jul. 25, 2013.
Non-Final OA in U.S. Appl. No. 12/415,839 mailed on Aug. 16, 2013.
Response to Non-Final Office Action dated Aug. 16, 2013 in U.S. Appl. No. 12/415,839 filed on Nov. 16, 2013.
Non-Final Office Action in U.S. Appl. No. 12/436,869 mailed on Feb. 7, 2012.
Response to Non-Final Office Action dated Feb. 7, 2012 in U.S. Appl. No. 12/436,869 filed on Apr. 25, 2012.
Final Office Action in U.S. Appl. No. 12/436,869 mailed on May 30, 2012.
Request for Continued Examination and Amendment in U.S. Appl. No. 12/436,869 filed on Jul. 25, 2012.
Non-Final Office Action in U.S. Appl. No. 12/436,912 mailed on Apr. 28, 2011.
Response to Non-Final Office Action dated Apr. 28, 2011 in U.S. Appl. No. 12/436,912 filed on Jul. 28, 2011.
Final Office Action in U.S. Appl. No. 12/436,912 mailed on Oct. 11, 2011.
Request for Continued Examination and Amendment in U.S. Appl. No. 12/436,912 filed on Dec. 8, 2011.
Non-Final Office Action in U.S. Appl. No. 12/436,912 mailed on Nov. 27, 2012.
Response to Non-Final Office Action dated Nov. 27, 2012 in U.S. Appl. No. 12/436,912 filed on Feb. 27, 2013.
Notice of Allowance in U.S. Appl. No. 12/436,912 mailed on Jul. 18, 2013.
U.S. Appl. No. 13/869,912, filed Apr. 24, 2013 and entitled "System and Method for Providing Calendar and Speed Dating Features for Matching Users in a Network Environment", Inventor Michael G. Bustamente.

(56) References Cited

OTHER PUBLICATIONS

U.S. Appl. No. 13/869,948, filed Apr. 24, 2013 and entitled "System and Method for Providing Calendar and Speed Dating Features for Matching Users in a Network Environment", Inventor Michael G. Bustamente.

Notice of Allowance in U.S. Appl. No. 12/436,869 mailed on Jul. 9, 2014.
Request for Continued Examination and Amendment in U.S. Appl. No. 12/415,839 filed on Sep. 8, 2014.
Non-Final Office Action in U.S. Appl. No. 12/415,839 mailed on Dec. 18, 2014.

* cited by examiner

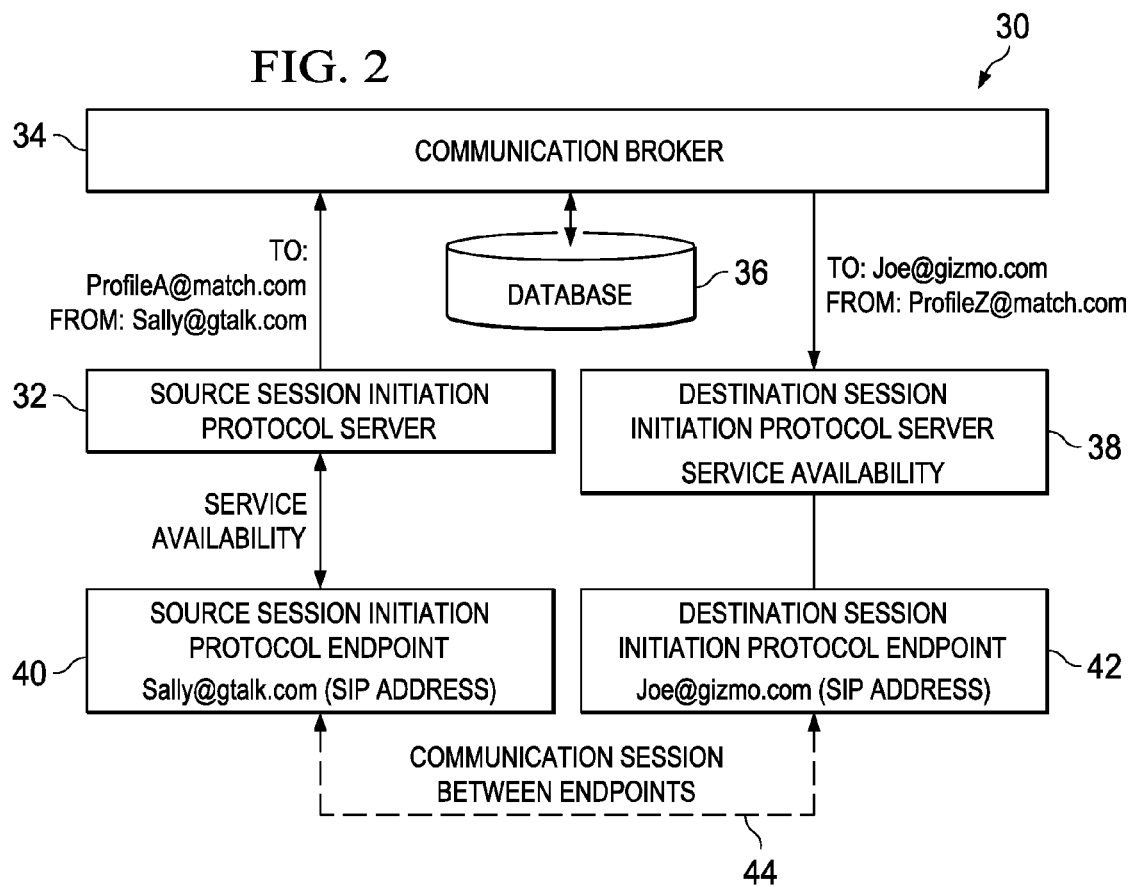

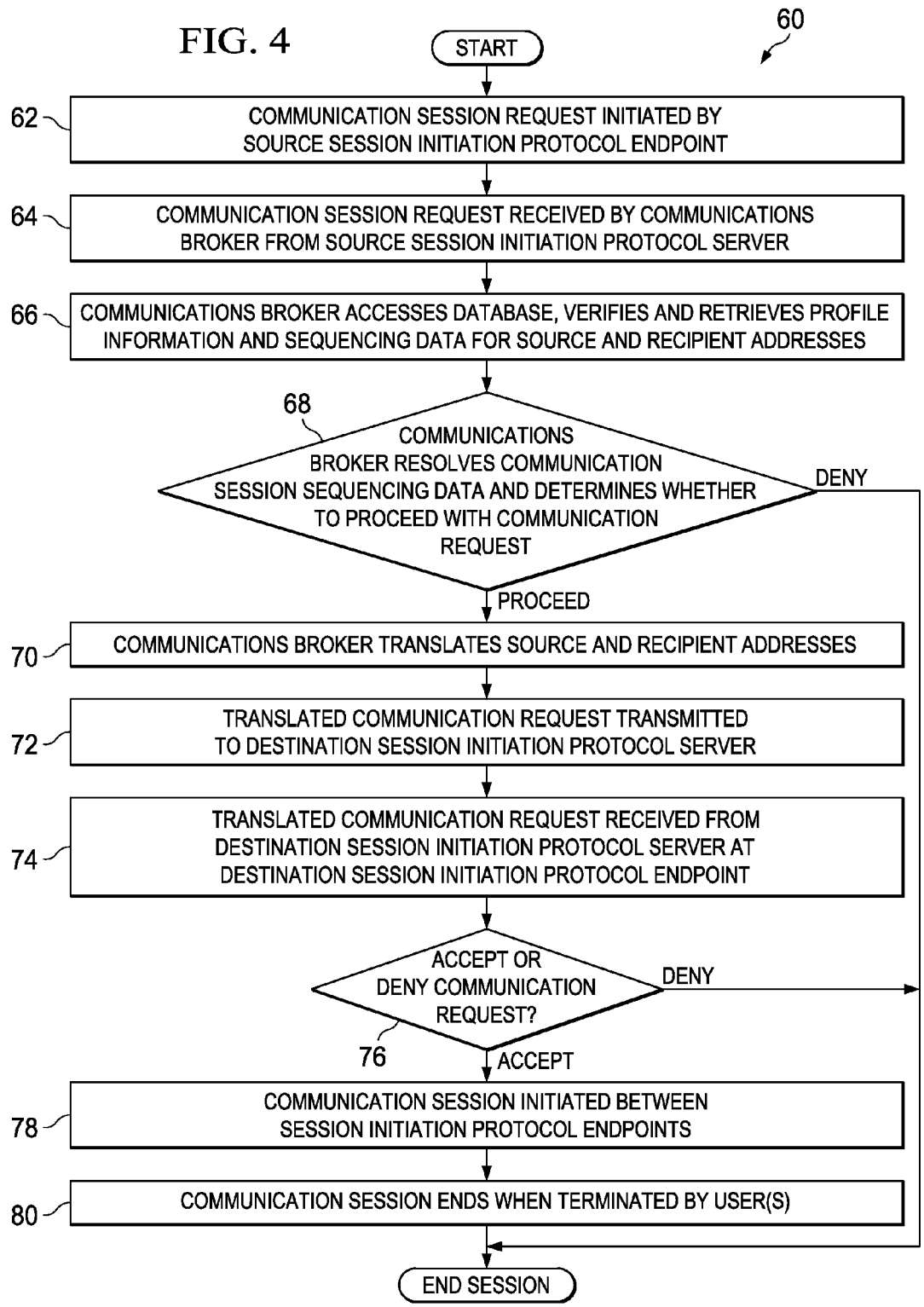

SYSTEM AND METHOD FOR PROVIDING SEQUENCED ANONYMOUS COMMUNICATION SESSIONS OVER A NETWORK

RELATED APPLICATIONS

The present application is related to the following applications: (1) U.S. application Ser. No. 12/415,839 filed Mar. 31, 2009, entitled "System and Method for Providing Anonymity in a Session Initiated Protocol Network," Inventor Michael G. Bustamente; and (2) the application filed contemporaneously herewith identified by U.S. application Ser. No. 12/436,869, filed May 7, 2009, entitled "System and Method for Providing Anonymity in a Video/Multimedia Communications Session Over a Network," Inventor Michael G. Bustamente. The disclosure of these related applications are considered part of (and are incorporated by reference in) the disclosure of this application.

TECHNICAL FIELD

This disclosure relates in general to the field of communications and, more particularly, to a system and a method for governing user interaction while providing user anonymity in a session initiated protocol network environment.

BACKGROUND

Electronic architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.). In some cases, end users desire that their identity, address, or other personal information remain anonymous. The ability to initiate a communication session between two users without exchanging personal information offers a significant challenge to network operators, administrators, and device manufacturers.

Likewise, end users and/or administrators may desire to schedule or "sequence" communication sessions at specified times and periods, or over different communication protocols, thereby preventing undesired or unauthorized communication sessions from being initiated or even allowed. The ability to sequence communication sessions between end users over a network presents a significant challenge to network operators and administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a diagram illustrating a network for providing sequenced, anonymous communications in an online network environment in accordance with one embodiment of the disclosure disclosed herein;

FIGS. 3A and 3B are block diagrams illustrating a packet network address translation context in accordance with one embodiment of the disclosure disclosed herein; and FIG. 4 is a flow diagram showing the method of one embodiment of the disclosure disclosed herein.

DETAILED DESCRIPTION OF EXAMPLE EMBODIMENTS

Figure 1:
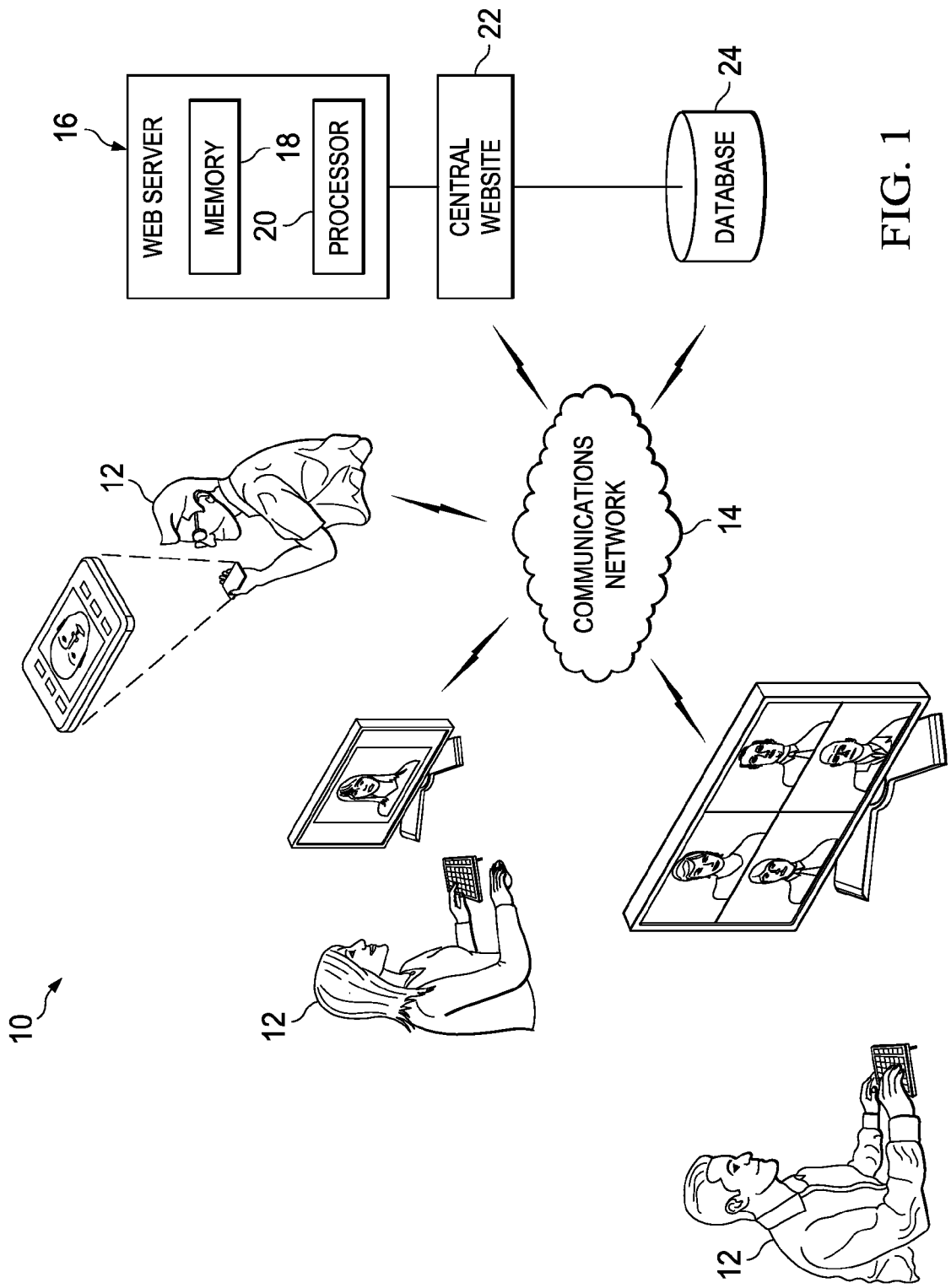
FIG. 1 is a network diagram showing an operating environment of the present disclosure in accordance with one embodiment of the present disclosure.

FIG. 1 is a simplified block diagram of a communication system 10 for communicating, receiving, and transmitting data in a communications environment (e.g., a SIP environment). Communication system 10 includes endpoints 12, a communications network 14, a web server 16 including memory 18 and processor 20, a central website 22, and database 24.

Endpoints 12 are clients, end users or customers wishing to initiate a communication in communication system 10 via some network. In one example implementation, endpoints 12 are personal computers, smartphones, or other communication devices that are operable to interface with a SIP network. Note also that the term 'endpoint' may be inclusive of devices used to initiate a communication, such as a computer, a personal digital assistant (PDA), a laptop or electronic notebook, a telephone, a cellular telephone, an IP telephone, an I-Phone, or any other device, component, element, or object capable of initiating voice, audio, or data exchanges within communication system 10. Endpoints 12 may also be inclusive of a suitable interface to the human user, such as a microphone, a display, or a keyboard or other terminal equipment. Endpoints 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Any device capable of operating as an endpoint 12 may connect to communications network 14 via wire, wireless, cellular, satellite link or other suitable interfaces. Web server 16, which includes memory 18 and processor 20, hosts central website 22 and has access to transmit and receive user or presence data (e.g., user profile data, user and/or user endpoint data, user contact data, user and network sequencing data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 12 that utilize different communication and/or networking protocols.

Central website 22 can be configured to interface with endpoints 12 and database 24, and may display data inputs from users via endpoints 12 and/or database 24. In one example, software that resides in web server 16 (which may be included within central website 22) is executed by processor 20 (potentially in conjunction with memory 18) to achieve the communication coordination at sequenced periods while protecting end user anonymity as outlined herein. Such activity could also be developed externally and then uploaded to web server 16 (i.e., central website 22). In an embodiment of the disclosure disclosed herein, web server 16 is configured as an "internet facing" server and not as a web server configured to search HTTP traffic on port 80, although any IP port including port 80 could be utilized.

With regard to the possible items that effectuate the teachings of the present disclosure, central website 22 and/or web server 16 may include software and/or algorithms to achieve the operations for processing, communicating, delivering, gathering, uploading, maintaining, analyzing, reconciling and/or generally managing data, as described herein. This includes suitably displaying some or all of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Considerable flexibility is provided by the structure of central website 22 and web server 16 in the context of system 10. Thus, it can be easily appreciated that such functions could be provided external to central website 22 and web server 16 (e.g., as a solitary and/or proprietary component). In such cases, such functionality could be readily embodied in a separate component, server, processor, device, or module. Note that these data coordination features and capabilities may be provided in just one of these elements, in both, or distributed across both of them.

For purposes of teaching and discussion, it is useful to provide some overview as to the way in which the disclosure disclosed herein operates in a SIP environment. The following information may be viewed as a basis from which the present disclosure may be properly explained. Such a discussion is for purposes of explanation only and, accordingly, should not be construed in any way to limit the broad scope of the disclosure disclosed herein and its potential applications. Though the current disclosure is illustrated in the SIP environment, it is not limited to SIP networks and can actually apply to other VoIP and multimedia protocols and networks, as well as multiplexing implementations, etc.

Many applications require the creation and management of a communication session, where a session is considered an exchange of data between an association of participants. The implementation of these applications is complicated by the practices of participants: users move between endpoints, they may be addressable by multiple names, and they may communicate in several different media (in many cases simultaneously). Certain protocols, such as SIP, VoIP, RTMP and H.323, have been developed to carry various forms of real-time multimedia communication session data such as voice, video, and text and multimedia messages.

Reliable, flexible, multimedia and voice traffic over internet protocol (IP) networks have been enabled by the SIP topology. SIP is an application layer, control protocol used to establish, modify, and terminate multimedia sessions or calls. SIP provides proxy-able messages used to perform call setup, modification, and termination functions. For example, one SIP message used to perform call setup functions is the INVITE message. The INVITE message is used to invite telephony devices to participate in media stream communications, such as voice communication, data communication, video communication, or any combination thereof. The INVITE message includes a session description protocol (SDP) portion that is used by end user devices to exchange media capabilities and other information. As unified networks emerge, it is becoming increasingly important to provide communication services seamlessly across SIP based packet networks to provide anonymized communication within these unified networks.

The SIP features of communications system 10 work in concert with these protocols by enabling endpoints 12 (which may also be referred to as "user agents") to discover one another and to agree on a characterization of a session they would like to share. For locating prospective session participants, and for other functions, SIP enables the creation of an infrastructure of network hosts (which may also be referred to as "proxy servers") to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions such as Internet telephony calls or videoconferences. SIP can also invite participants to already existing sessions such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both the called and calling party locations; and 5) session management: including transfer and termination of sessions, modifying session parameters, and invoking services.

A standard SIP platform does not necessarily provide services. Rather, SIP provides primitives that can be used to implement different services. For example, SIP can locate a user and deliver opaque objects to his current location. If this primitive is used to deliver a session description written in SDP, for instance, the endpoints can agree on the parameters of a session. If the same primitive is used to deliver a photo of the caller as well as the session description, a "caller id" service can be easily implemented.

In some online social networks, end users desire that a user's identity, address, telephone number or other personal information remain anonymous so that other users on the network may not physically, electronically, or otherwise locate a user or utilize a user's contact information for a nefarious purpose. Likewise, end users desire the ability to schedule communication sessions at periods convenient for them to conduct a communication session and prevent the initiation of communication sessions at inconvenient times or dates (e.g. calls after 11 p.m. or session requests at 2 a.m.). Thus, the ability to initiate a communication session (e.g. text messaging sessions, multimedia sessions, videoconference sessions, voice call sessions, etc.) between two end users, without the exchange of personal contact information and at periods convenient for each user in the context of a social networking network is critical from various standpoints, including personal safety, identity theft/fraud prevention, and personal convenience.

From the perspective of an administrator, the ability to sequence communications sessions between end users based on various metrics enables efficient, safe and profitable administration of the network system. In an online social network for example, administrators may sequence communication sessions between end users based upon privileges granted to end users who subscribe to various membership levels offered by the online network or based upon pay per session, pay per media models or other metrics applicable to operation of the network. As described herein, the term "sequence" also includes the ability to schedule and/or govern all facets of communication sessions between the end users.

FIG. 2 depicts the components of a communications network 30 for providing user anonymity and sequencing for communication sessions between end users. The network utilizes a source SIP server 32, a communications broker 34, a database 36, a destination SIP server 38, a source SIP endpoint 40, and a destination SIP endpoint 42. In one embodiment of the disclosure disclosed herein, a first user desires to initiate a videoconference with a second user in a social networking environment. For example, the first user (e.g., Sally) desires to have a videoconference with a second user (e.g., Joe) whose personal profile she has reviewed on a social networking site, such as Match.com. Joe's personal contact information, which may include his internet protocol SIP address (e.g., Joe@gizmo.com), is not displayed publicly on the site, but a "profile name" is used [e.g., ProfileA@match.com]). Likewise, Sally's personal contact information, which may include her SIP address (sally@gtalk.com), is not displayed publicly on the site and her profile name is used (e.g., ProfileZ@match.com). To initiate the contact process, the first user Sally utilizes a cell phone, Smartphone, personal computer or any other device capable of acting as SIP endpoint 40 to initiate a communication session with a second user Joe, who utilizes a cell phone, Smartphone, personal computer, or other device capable of acting as a SIP endpoint. Source SIP endpoint 40 sends a service availability request to source SIP server 32. SIP server 32 responds by initiating a session invitation to communications broker 34. Communications broker 34 accesses database 36 and receives presence data, which includes personal contact and sequencing data, for both the first and second users. The personal contact information and communication sequencing information may include data which has been directly input by the end users (e.g. time and dates for communication sessions) or which maybe internally input and regulated by the administrator (e.g. membership/access metric information). For example, Joe may only receive videoconferences calls between 7 p.m. and 10 p.m., while Sally may only participate in videoconferences between 6 p.m. and 9 p.m.

Communications broker 34 reconciles the communication sequence data and determines if Sally and Joe may participate in a videoconference session. In this example, communications broker 34 resolves that, as between Sally and Joe, a video conference session maybe initiated between the hours of 7 p.m. and 9 p.m. Database 36 and/or communications broker 34 may then provide the destination contact information for the call set-up process performed by communications broker 34. Additional information may also be provided by the end users and/or the administrator related to the sequencing of communication sessions based on various metrics, including but not limited to, date, time, duration of the communication session, call back or ring back preferences, type of communication session, network membership/access privileges or any combination thereof. For example, administrators may provide sequencing limitations related to end user membership privileges or pay to communicate protocols (e.g. $XX.XX per message, or per unit of time, for instant messaging/chat sessions; or, $XX.XX per hour for videoconferencing sessions). Such sequencing limitations may also be formulated to take advantage of network bandwidth availability at various times of the day or night.

FIGS. 3A and 3B describe the call set-up process resulting in the removal of personal contact information exchanged between a first and a second user, thereby resulting in the anonymous exchange of communications between users. FIG. 3A depicts a packet 50 of electronic information, which is received by communications broker 34 from source SIP server 32, as shown in FIG. 2. Packet 50 contains address information from a first user (Sally) with a personal contact address (sally@gtalk.com) requesting a call set-up with a second user (Joe), who has profile contact address (profileA@match.com). As discussed above and with reference to FIG. 2, communications broker 34 accesses database 36 and retrieves information for translating (i.e. "mapping"), and thereby rendering anonymous, the profile name(s), profile contact address, and personal contact information of each user. Communication broker 34 prepares packet 52, as shown in FIG. 3B, with information showing the destination personal contact address of the second user (e.g., joe@gizmo.com) from a first user profile address (profilenameZ@match.com), in this example Sally's profile contact address. By translating the personal contact information and profile names of the first and second users, communications broker 34 effectively prevents both the first and second users from transmitting or receiving any personal contact information during call initiation, call session, and call teardown aspects of a SIP session.

Referring back to FIG. 2, communications broker 34 next transmits a communication session call invitation message addressed to a second user (joe@gizmo.com) from a first user (profileZ@match.com) to destination SIP server 38. Destination SIP server 38 sends a service availability request to destination SIP endpoint 42 (e.g., Joe's cell phone, Smartphone, personal computer) which if available and accepted by Joe, initiates a communication session call set-up invitation back to Sally at SIP endpoint 40 via communications broker 34. A communications session is then initiated directly between the users (e.g., Sally and Joe exchanging data at link 44) via their respective endpoints 40, 42, without the exchange of personal contact information. As a result, the end users may participate in a videoconference at times that are convenient for both parties, while maintaining anonymity during the communication session.

FIG. 4 is a flow diagram illustrating a method 60 embodiment of the disclosure disclosed herein. As previously described, a first user or source initiates a communication session request from a SIP endpoint that is addressed to a second user or recipient (step 62) with a profile address. The communication session request is transmitted by a source SIP server and received by a communications broker (step 64). The communications broker accesses a database that verifies and retrieves the profile information and sequencing data for the first and second users associated with the source and recipient address information in the call request (step 66). The communications broker reconciles the sequencing data, and upon such reconciliation, determines to either accept or deny the communication session request (step 68).

If the communications broker determines that the communication session request does not fall within the acceptable communication session sequence data, the communication broker denies the communication session request and the communication setup is terminated. If the communications broker determines that the communication request falls within acceptable communication session sequences of the end user(s), the communications broker translates or "maps" the source and recipient addresses from the information retrieved from the database (step 70). The communications broker transmits the translated call request to the recipient originating from the source profile address (step 72), with the translated call request being received by the recipient SIP endpoint from the recipient SIP server (step 74). The call recipient must then decide whether to accept or deny the call request (step 76). If the recipient accepts the call request, a communication session (e.g., telephone call, text messaging session, videoconference etc.) is initiated between the SIP endpoints (step 78). The session can remain active until terminated by the user(s) (step 80). However, if the recipient denies the request for a communication session from the source, the session is terminated.

It is important to note that the stages and steps in FIGS. 2 through 4 illustrate only some of the possible scenarios that may be executed by, or within, the present system. Some of these stages and/or steps may be deleted or removed where appropriate, or these stages and/or steps may be modified, enhanced, or changed considerably without departing from the scope of the present disclosure. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the disclosure. Accordingly, communications capabilities, data processing features and elements, suitable infrastructure, and any other appropriate software, hardware, or data storage objects may be included within the communication system and network disclosed herein to effectuate the tasks and operations of the elements and activities associated with executing a system and method for providing communication sequencing and anonymity in a SIP network environment.

Note that from a business perspective (e.g., as a service provider operating in the framework outlined by teachings of the presented concepts), an entity could work in conjunction with end users to provide a framework to authorize permissible actions in facilitating an anonymous, safe, and orderly flow of communications. There is considerable value in walking end users through increasingly higher levels of non-verbal communication. This can be done in a natural way such that it protects the end user's identity, while providing a service that makes complete sense for them to pay for the ability to use.

Consider an example that is illustrative, a person can spend an hour writing an e-mail and, with spell checker and other tools, come across as someone other than who they truly are. If the two individual's communication are moved to a voice call, this adds value through the non-verbal communication, which each received and which cannot be discerned through a benign e-mail. A voice call can allow an end user to converse with someone and gather many clues about their education, intelligence, background, social skills, etc. that are much more difficult to gather over e-mail.

Shifting the attention to video, in video applications (as highlighted herein), the non-verbal context moves higher with mannerisms, physical appearance, and the way people project themselves. This has value and this could make virtual dates valuable for end users (e.g., in an on-line dating community). Each level of heightened communication effectively sheds a layer of artificiality off the end users. In one general sense, individuals are becoming more intimate, more familiar, or simply gathering more information about their respective counterparty.

The same could be said of using such an architecture for job searches, as the architecture presented herein can be used to identify highly qualified individuals before embarking on a formal interview process. A brief anonymous voice call or video conference could avoid wasting the time and expense to interview someone in person, who simply would never satisfy the job criteria.

Lastly, the concepts presented herein can be used to practice certain skills (e.g., interfacing with the opposite sex, interviewing repeatedly with employers, etc.). The architecture tendered herein can provide a safe place to further develop communication skills, while auguring toward an ideal relationship, job, etc.

Although the present disclosure has been described in detail with reference to particular embodiments, it should be understood that various other changes, substitutions, and alterations may be made hereto without departing from the spirit and scope of the present disclosure. The illustrated network architecture of FIG. 1 has only been offered for purposes of example and teaching. Suitable alternatives and substitutions are envisioned and contemplated by the present disclosure, with such alternatives and substitutions being clearly within the broad scope of communication system 10. For example, use of a local area network (LAN) for the outlined communications could be easily replaced by a virtual private network (VPN), a metropolitan area network (MAN), a wide area network (WAN), a wireless local area network (WLAN), or any other element that facilitates data propagation for SIP endpoints or telephone branch offices. In addition, while the foregoing discussion has focused on SIP, any other suitable session, internet, or communication protocol may benefit from the teachings provided herein. The present disclosure is not to be construed as being confined to the SIP platform or its proscriptions.

In addition, some of the steps illustrated in the preceding figures may be changed or deleted where appropriate and additional steps may be added to the process flows. These changes may be based on specific communication architectures or particular interfacing arrangements and configurations of associated elements and do not depart from the scope or the teachings of the present disclosure. It is important to recognize that the FIGURES illustrate just one of a myriad of potential implementations of system 10.

Numerous other changes, substitutions, variations, alterations, and modifications may be ascertained to one skilled in the art and it is intended that the present disclosure encompass all such changes, substitutions, variations, alterations, and modifications as falling within the spirit and scope of the appended claims.

What is claimed is:

1. A computer-implemented method, comprising:
receiving a request for a multimedia communication session at a communications broker in a communication network, wherein the communications broker comprises a memory for storing data and instructions, and a processor for executing the instructions, wherein the communications broker is connected to the communications network, wherein a source address of the request indicates a personal contact address of a first user and a recipient address of the request indicates a profile name of a second user in a social networking platform, wherein the first user and the second user are associated with respective profile names in the social networking platform, wherein the profile names are different from respective personal contact addresses of the first user and the second user, wherein the profile names are displayed publicly and the personal contact addresses are not displayed publicly on the social networking platform;
accessing, by the communications broker, a communication sequencing information including data input by the first user and the second user and data input by a social networking platform administrator, wherein the communication sequencing information includes metrics related to sequencing of the multimedia communication session, wherein the metrics include call back preferences and sequencing limitations related to membership privileges, pay to communicate protocols, and network bandwidth availability;
determining, by the communications broker, a common session availability for the first user and the second user based on evaluating the communication sequencing information;
preparing, by the communications broker, a multimedia communication session call invitation message with information showing the source address to be the personal contact address of the second user and the recipient address to be the profile name of the first user; and
transmitting, by the communications broker, the multimedia communication session call invitation message for a time frame indicated by the common session availability.

2. The method of claim 1, further comprising:
translating the personal contact address of the first user in the request to the corresponding profile name of the first user; and
translating the profile name of the second user in the request to the corresponding personal contact address of the second user.

3. The method of claim 1, wherein the metrics further include date, time, type of the multimedia communication session, and duration of the multimedia communication session.

4. The method of claim 1, wherein the multimedia communication session is initiated directly between the users via respective endpoints without exchange of the personal contact addresses.

5. The method of claim 1, wherein the communications broker denies the request if the communication sequencing information indicates no common session availability.

6. The method of claim 1, wherein the communications broker serves as an intermediary between the first and second users during the multimedia communication session.

7. The method of claim 1, wherein the second user can accept or deny the multimedia communication session call invitation message, wherein if the second user accepts the multimedia communication session call invitation message, the multimedia communication session is initiated between the first user and the second user.

8. An apparatus, comprising:
a communications broker in a communication network;
a memory; and
a processor that executes instructions associated with the data, wherein the processor and the memory cooperate, such that the apparatus is configured for:
receiving a request for a multimedia communication session at the communications broker, wherein a source address of the request indicates a personal contact address of a first user and a recipient address of the request indicates a profile name of a second user in a social networking platform, wherein the first user and the second user are associated with respective profile names in the social networking platform, wherein the profile names are different from respective personal contact addresses of the first user and the second user, wherein the profile names are displayed publicly on the social networking platform and the personal contact addresses are not displayed publicly;
accessing a communication sequencing information including data input by the first user and the second user and data input by a social networking platform administrator, wherein the communication sequencing information includes metrics related to sequencing of the multimedia communication session, wherein the metrics include call back preferences and sequencing limitations related to membership privileges, pay to communicate protocols, and network bandwidth availability;
determining a common session availability for the first user and the second user based on the communication sequencing information; and
transmitting a multimedia communication session call invitation message for a time frame indicated by the common session availability, wherein the source address of the call invitation message indicates the personal contact address of the second user, and the recipient address of the call invitation message indicates the profile name of the first user.

9. The apparatus of claim 8, further comprising:
translating the personal contact address of the first user in the request to the corresponding profile name of the first user; and
translating the profile name of the second user in the request to the corresponding personal contact address of the second user.

10. The apparatus of claim 8, wherein the metrics further include date, time, type of the multimedia communication session, and duration of the multimedia communication session.

11. The apparatus of claim 8, wherein the multimedia communication session is initiated directly between the users via respective endpoints without exchange of the personal contact addresses.

12. The apparatus of claim 8, wherein the communications broker denies the request if the communication sequencing information indicates no common session availability.

13. The apparatus of claim 8, wherein the communications broker serves as an intermediary between the first and second users during the multimedia communication session.

14. Non-transitory tangible media encoding instructions for execution, which when executed by a processor of a communications broker, is operable to perform operations comprising:
receiving a request for a multimedia communication session at the communications broker, wherein a source address of the request indicates a personal contact address of a first user and a recipient address of the request indicates a profile name of a second user in a social networking platform, wherein the first user and the second user are associated with respective profile names in the social networking platform, wherein the profile names are different from respective personal contact addresses of the first user and the second user, wherein the profile names are displayed publicly on the social networking platform and the personal contact addresses are not displayed publicly;
accessing a communication sequencing information including data input by the first user and the second user and data input by a social networking platform administrator, wherein the communication sequencing information includes metrics related to sequencing of the multimedia communication session, wherein the metrics include call back preferences and sequencing limitations related to membership privileges, pay to communicate protocols, and network bandwidth availability;

determining a common session availability for the first user and the second user based on the communication sequencing information;

preparing a multimedia communication session call invitation message with information showing the source address to be the personal contact address of the second user and the recipient address to be the profile name of the first user; and transmitting the multimedia communication session call invitation message for a time frame indicated by the common session availability.

15. The media of claim 14, further comprising:

translating the personal contact address of the first user in the request to the corresponding profile name of the first user; and translating the profile name of the second user in the request to the corresponding personal contact address of the second user.

16. The media of claim 14, wherein the metrics further include date, time, type of the multimedia communication session, and duration of the multimedia communication session.

17. The media of claim 14, wherein the multimedia communication session is initiated directly between the users via respective endpoints without exchange of the personal contact addresses.

18. The media of claim 14, wherein the communications broker denies the request if the communication sequencing information indicates no common session availability.

19. The media of claim 14, wherein the communications broker serves as an intermediary between the first and second users during the multimedia communication session.

20. The media of claim 14, wherein the second user can accept or deny the multimedia communication session call invitation message, wherein if the second user accepts the multimedia communication session call invitation message, the multimedia communication session is initiated between the first user and the second user.

* * * * *